Nov. 11, 1969 W. R. WEDMORE 3,478,314

TRANSISTORIZED EXCLUSIVE-OR COMPARATOR

Filed April 26, 1966

INVENTOR.
WILLIAM R. WEDMORE

BY [signature]

ATTY.

United States Patent Office 3,478,314

Patented Nov. 11, 1969

3,478,314
TRANSISTORIZED EXCLUSIVE-OR COMPARATOR

William R. Wedmore, Glen Ellyn, Ill., assignor to Automatic Electric Laboratories, Inc., Northlake, Ill., a corporation of Delaware Filed Apr. 26, 1966, Ser. No. 545,387
Int. Cl. G06f 7/02
U.S. Cl. 340—146.2 1 Claim

ABSTRACT OF THE DISCLOSURE

An exclusive-OR comparator circuit utilizing a group of four two-input exclusive-OR gates, each having their outputs connected into a single NOR gate. Each exclusive-OR gate includes a single transistor and a pair of diodes, while the NOR gate uses a single transistor. An additional input is also connected to the NOR gate, to disable it, when the function of this circuit is not required.

Figure 1:
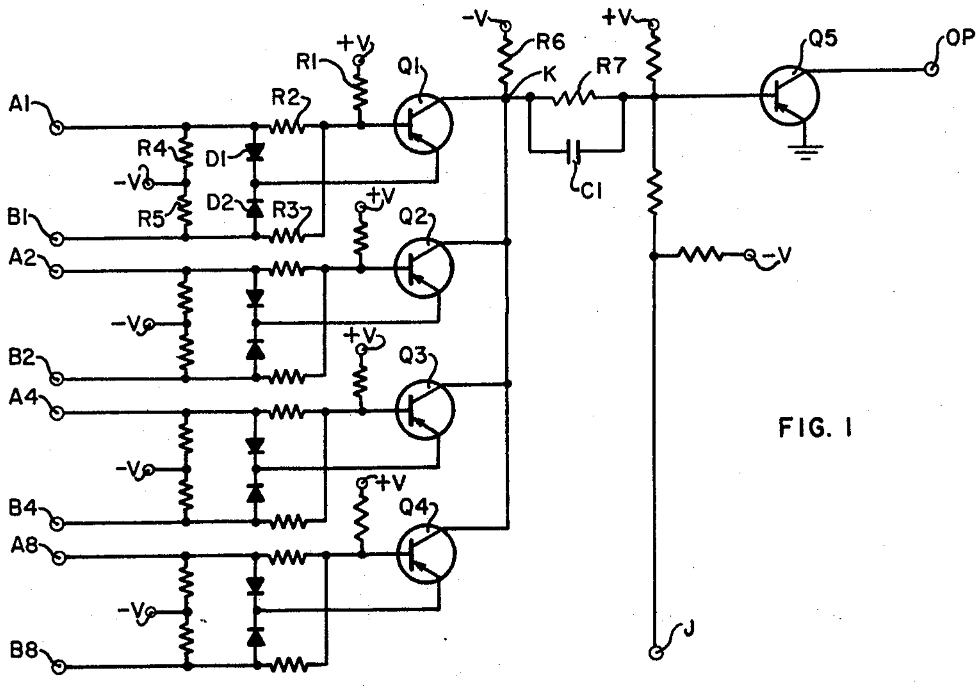

This invention relates to switching or logic circuits to perform logical functions in electronic digital systems, and more particularly it concerns an improved circuit for the comparison of two sets of data.

A logical circuit is frequently defined as a circuit having a plurality of inputs and a single output which is a result of distinctive combinations or permutations of its input signals, to thereby provide a means for the logical discrimination among the combinations of signals. Signals of other combinations than that for which the circuit is designed produce no effect at the output.

Logical circuits have varied applications, and are extensively used in switching and computer circuits for the internal routing of information. Depending on the logic utilized by the associated apparatus, logical circuits may be designed to utilize positive or negative voltages, the type of logic being identified by the polarity of the input variables. Using positive logic, positive signals are considered pertinent; using negative logic, negative signals are considered pertinent.

Certain basic logical circuits, such as "And", "Or" and "Inverter" circuits, for example, are well-known and widely employed in the art to provide designated fundamental logical expressions. More complex logical functions are provided by distinctive combinations of the above-noted basic logical circuits. One specific type of a more complex logical circuit is known as an "Exclusive Or" circuit, and is defined as a circuit which provides an output signal whenever an input signal is received at any single one of its inputs, but not when input pulses are absent or received simultaneously at a plurality of the inputs. Considering a circuit having input variables A and B, the logical "Exclusive Or" function is identified by the expression $A\bar{B}+\bar{A}B$. While the "Exclusive Or" circuit is used for information transmission within the computer itself, it is also widely employed in error checking circuitry associated with computers.

An "Exclusive Or" logical function may also be achieved by certain distinctive combinations of the heretofore enumerated basic logic circuits, such modifications may, however, be unsatisfactory, due to the considerable amount of equipment required to achieve the desired logical relationship.

Because of their compatibility with minimum space requirements, low power consumption and ability to function at high speed with very low signal levels, transistors are being employed on an ever increasing scale in control circuitry. The present invention is directed toward a binary logical "Exclusive Or" circuit utilizing semiconductors. The circuit employs a unique configuration of transistors and diodes to distinguish between the many possible combinations of the input variables and provide an output signal indicative of the logical resultant. While the use of transistors to perform basic logical functions is known, the present invention provides a relatively simple circuit to solve a relatively complex logical function. The unique circuit configuration permits very high speed operation at low signal levels, and provides a circuit which is compatible with auxiliary equipment utilizing transistors. Accordingly, it is a general object of the present invention to provide an improved circuit suitable for the comparison of two sets of data.

A more specific object is to provide a high speed comparison circuit wherein a saving in components is effected.

Another object of the present invention is to provide a logical combination of "Exclusive Or" circuits utilizing semiconductors.

Other objects of the invention will be pointed out in the following description and claims and illustrated in the accompanying drawings, which disclose, by way of example, the principle of the invention and the best mode, which has been contemplated, of applying that principle.

Figure 2:
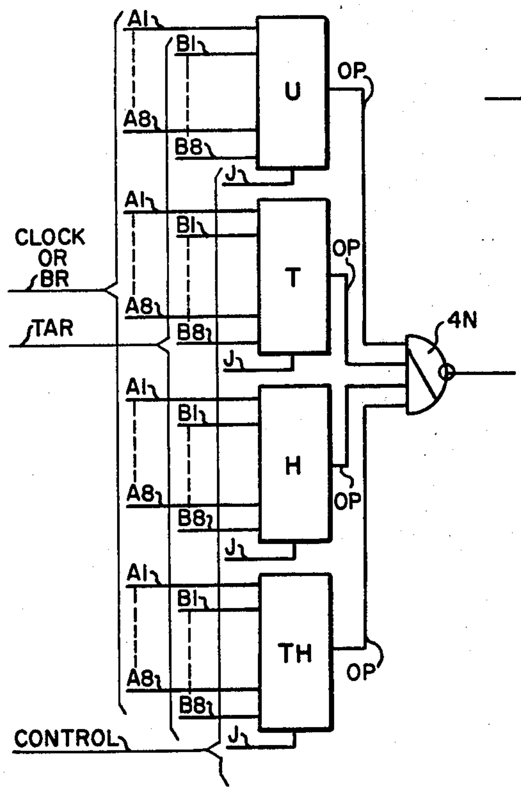
Figure 3:
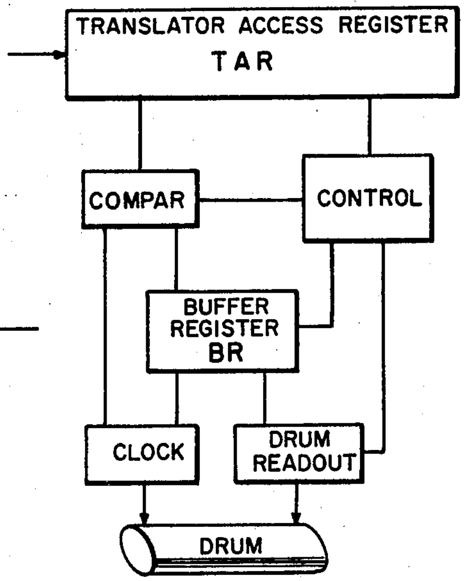

In the drawings, FIG. 1 illustrates in schematic form a preferred embodiment of the present invention; FIG. 2 shows a block diagram form the grouping of four comparison circuits; and FIG. 3 shows in block diagram form an application of the grouping of FIG. 2.

Referring now to the drawing, there is illustrated in FIG. 1 a first pnp transistor Q1 with its base connected to a positive potential via resistor R1. A first input A1 and a second input B1 are also connected to the base of Q1 through the respective resistances R2 and R3. Inputs A1 and B1 have a pair of resistors R4 and R5 connecting them to a negative potential, as well as through a pair of diodes D1 and D2 to the emitter of Q1. The collector of Q1 is connected in common with the collectors of Q2, Q3 and Q4 to a negative potential through resistance R6.

Transistor Q1 produces a logic "0" whenever the two inputs disagree. When one input is at logic "1" while the other input is at logic "0," the logic level "0" is applied through the two diode gates to the emitter. These diodes act as a conventional "or" gate with the transistor and its collector supply voltage.

The "NOR" logic as used here is an extention of the use of resistors in the base circuit. If any one of the inputs is made negative, sufficient base current results to cause the transistor to conduct heavily.

With a logic "0" level at the emitter and a logic "1" level at one of the two base inputs, the transistor will conduct and produce the logic "0" output level. If both inputs are at the same logic levels, the transistor will not conduct since the emitter-base junction is reverse-biased. The output at this time will be clamp voltage which is the logic "1."

Transistors Q2, Q3 and Q4 operate in a similar manner for their respective inputs $A2+B2$, $A4+B4$ and $A8+B8$. The transistor Q5 serves to amplify and invert the received signal input to it.

Coincidence will occur when the inputs of each pair agree logically; i.e. $A1=B1$, $A2=B2$, $A4=B4$ and $A8=B8$. However, it must be noted that the input pairs do not have to agree with each other for coincidence to occur.

With coincidence existing at the inputs, transistors Q1, Q2, Q3, and Q4 are all open, logically making point $K=1$ (approximately −8 v.). At point "K" the logic expression for coincidence is:

$$K=\overline{A1}\,\overline{B1}+A1\,B1)\,(\overline{A2}\,\overline{B2}+A2\,B2)\,(\overline{A4}\,\overline{B4}+A4\,B4)\,(\overline{A8}\,\overline{B8}+A8\,B8)$$

Making any pair of inputs dissimilar (for example, input $A1=1$ and inputs $B1=0$) will cause the transistor associated with this input pair to go into saturation, making point $K=0$ (approximately ground).

The output gate (circuitry associated with transistor Q5) is a buffer between the actual comparator circuit and the load. Input "J" is provided to inhibit the output; i.e., with $J=1$, the output remains at "0" even though a non-coincident condition may exist at the inputs. The output logic available from the comparator circuit is:

$$OP=\overline{J}(\overline{A1}\,\overline{B1}+\overline{A1}\,B1+A2\,\overline{B2}+\overline{A2}\,B2+A4\,\overline{B4}+\overline{A4}\,B4+A8\,\overline{B8}+\overline{A8}\,B8)$$

In an electronic automatic exchange system of the type disclosed in U.S. Patent No. 3,284,574, filed Sept. 16, 1963 for Kostogiannis and Langowski entitled "Magnetic Drum Translator," one application for the comparator circuit is to check for coincidence between the information in the translator access register (TAR) and the buffer register (BR), see FIG. 3. Here, a directory number as dialed through associated circuitry is introduced into the TAR, where it appears in binary form as the outputs of flip-flops. The outputs of four of these flip-flops, indicating a digit in binary form, are connected to the A1, A2, A4 and A8 inputs of a comparator circuit. The directory numbers, which have been previously recorded on the drum, are sequentially read out as the drum rotates. These directory numbers appear in binary form at the outputs of the BR flip-flops. These outputs are fed into the B1, B2, B4 and B8 inputs of the comparator circuit, where they are checked against the A1, A2, A4 and A8 inputs.

Consider that the directory number consists of four digits, each consisting of four binary bits. In this case, four parity circuits will be used (refer to FIG. 2). Assume that the directory number 1234 is in the TAR, and that the flip-flops in the TAR are set as indicated. As the drum rotates, the flip-flops in the BR are constantly being set and reset to correspond with the directory number that is being read out of the drum. During the period of time when number 1234 is being read out of the drum, the flip-flops in the BR become coincident with the flip-flops in the TAR. The comparator circuits will see this condition, and respond with "0" outputs. These "0" outputs are then fed into a 4-input nor-gate 4N, which will respond with a "1" output. This output will command external circuitry to read out from the drum switching instructions for directory number 1234.

If switching instructions for a three digit directory number are desired, the thousands group comparator circuit can be blocked by applying a "1" to the "J" input of comparator circuit "T*h*."

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

What is claimed is:

1. A switching circuit for use in an electronic digital system comprising:

a plurality of "exclusive OR" logical circuits each comprising; a transistor having emitter, collector, and base electrodes; means for applying operating potentials to said electrodes including a first impedance to connect said collector electrode to a first operating potential, a second impedance to connect said base electrode to a second operating potential, third and fourth impedances coupling said base to first and second input voltage sources, respectively; and, first and second asymmetric devices coupling said emitter electrode to said first and second input voltage sources, respectively; and, fifth and sixth impedances coupling said first operating potential to said first and second input voltage sources; whereby a first output is produced at said collector electrode in response to an input voltage from only one of said input voltage sources individually, and a second output is produced in response to simultaneous input voltages from both sources, and inverter circuit connected to the collector electrodes of each of said plurality of "exclusive OR" logical circuits to produce an inverted output in response to said first output from each of said plurality of "exclusive OR" circuits and an input means connected to said inverter circuit to block said inverter circuit upon the application of a signal thereto.

References Cited

UNITED STATES PATENTS

| | | | |
|---|---|---|---|
| 3,369,184 | 2/1968 | Zonis | 307—216 X |
| 2,879,411 | 3/1959 | Faulkner | 307—216 |
| 3,311,753 | 3/1967 | Nelson | 340—146.2 X |
| 2,984,824 | 5/1961 | Armstrong et al. | 340—146.2 X |
| 3,348,199 | 10/1967 | Jörgensen | 340—146.2 |
| 3,281,607 | 10/1966 | Gariano | 340—146.2 X |

MALCOLM A. MORRISON, Primary Examiner

D. H. MALZAHN, Assistant Examiner

U.S. Cl. X.R.

307—216